May 26, 1964  E. D. PIERSON ETAL  3,134,476
CORNER TRANSFER UNIT FOR CONVEYOR SYSTEMS
Filed March 28, 1962  6 Sheets-Sheet 1

INVENTORS
EDWARD D. PIERSON
JAMES C. WRIGHT
BY
ATTORNEYS

May 26, 1964 E. D. PIERSON ETAL 3,134,476
CORNER TRANSFER UNIT FOR CONVEYOR SYSTEMS
Filed March 28, 1962 6 Sheets-Sheet 3

INVENTORS
EDWARD D. PIERSON
JAMES C. WRIGHT
BY
ATTORNEYS

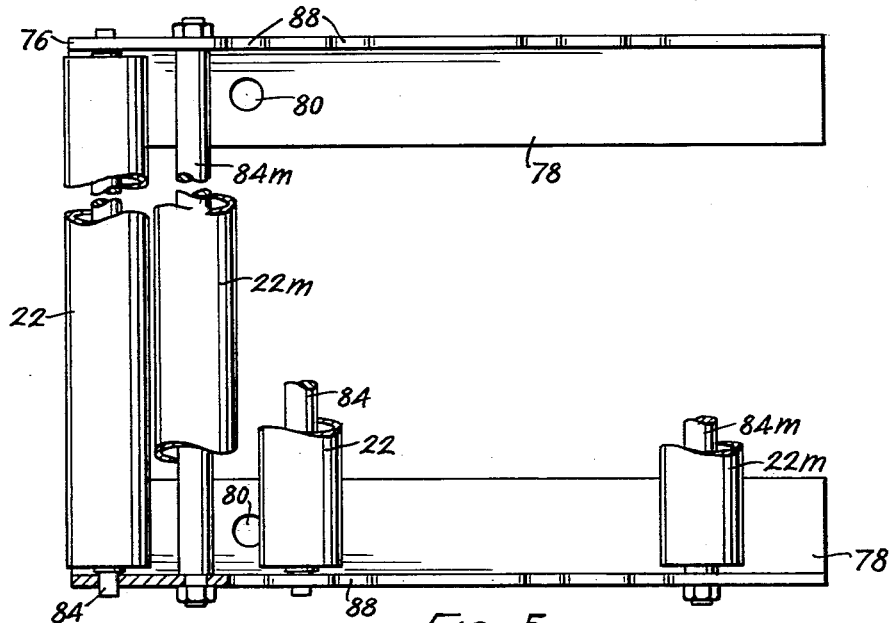
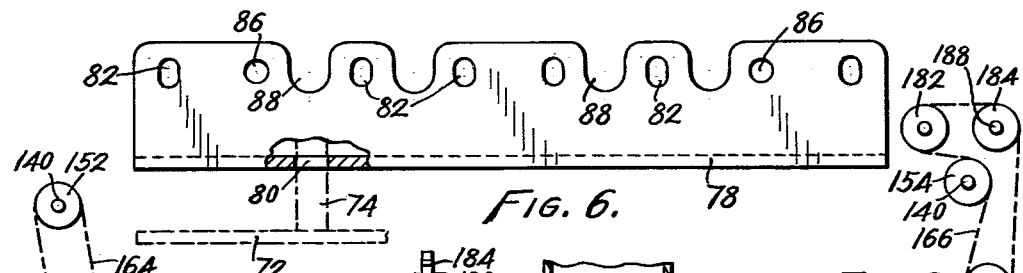
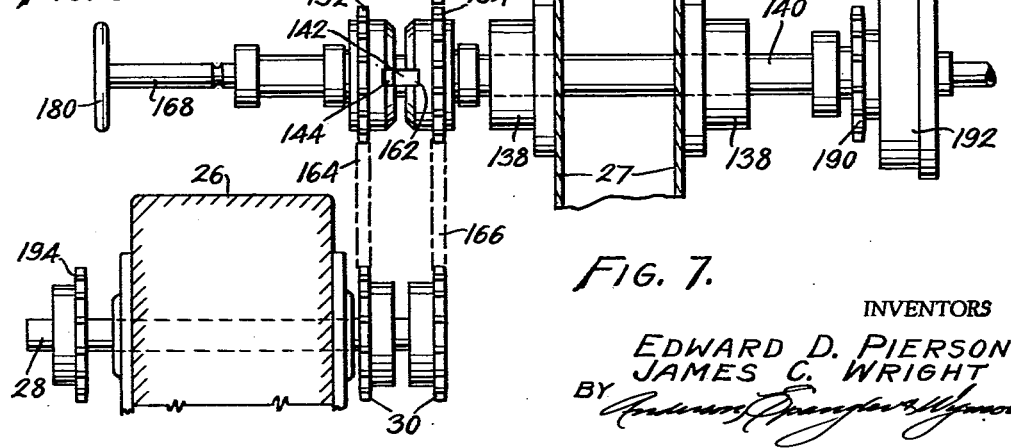

May 26, 1964　　　E. D. PIERSON ETAL　　　3,134,476
CORNER TRANSFER UNIT FOR CONVEYOR SYSTEMS

Filed March 28, 1962　　　　　　　　　　　　　6 Sheets-Sheet 5

INVENTORS
EDWARD D. PIERSON
JAMES C. WRIGHT
BY
ATTORNEYS

United States Patent Office 3,134,476
Patented May 26, 1964

3,134,476
CORNER TRANSFER UNIT FOR
CONVEYOR SYSTEMS
Edward D. Pierson and James C. Wright, Denver, Colo., assignors to Miner Machine Company, Denver, Colo., a corporation of Colorado
Filed Mar. 28, 1962, Ser. No. 183,231
12 Claims. (Cl. 198—20)

This invention relates to corner transfer devices and, more particularly, to automatic units of the class described that are especially suited for use in conveyor systems for transporting stacked and bundled articles around right angle corners.

There are many different types of conveyors available commercially which are capable of transporting most packaged materials around a corner. Some of these are power-driven while others are of the gravity type. Each seems to possess certain worthwhile features that render it ideally suited to specific applications.

Even so, there remain a number of rather highly specialized conveying problems that demand equipment designed specifically to cope with them. Among these are the difficulties found in the publishing industry in connection with high speed handling of stacked and bundled magazines and newspapers. The delicate nature of the product demands the use of a conveyor that will not tear or soil the paper, especially the one on the bottom of the stack. The conveyor system must also be able to handle the stacks or bundles at high speed due to the tremendous capacity of modern press-room equipment and, for this reason, most conveyors are power-driven rather than being of the gravity type. In addition, versatility is a prime requisite as the equipment must frequently deliver the stacks and bundles to different loading and unloading stations during a given press run on more or less an instant's notice.

Perhaps the most significant problem is, however, cornering stacks and bundles at high speed. Loose stacks, especially, are most difficult to handle through a change in direction, without their spilling. Even bundles are likely to become skewed resulting in torn or damaged corners. It is to these problems that the present invention is directed.

The corner transfer device herein claimed is ideally suited for use in accomplishing right angle changes in direction at high speeds of bundled and stacked articles. The cornering device, is of course, equally useful in conveying other than stacked and bundled articles around a corner such as, for example, cartons and the like; however, it is in connection with the former applications that the full capabilities of the unit are realized. Ordinarily, a pair of power-driven conveyors are disposed at right angles with the corner transfer unit positioned therebetween; however, a loading or unloading station can be substituted for either one of the conveyors.

The device is fully automatic and includes a self-contained drive. Contributing to the unit's versatility is the fact that it is reversible to interchange the intake and discharge positions. Furthermore, it is constructed to include in the same unit means for feeding from any one of the four sides while discharging to either side of the intake. The device can be placed at the intersection of as many as four conveyors arranged at right angles to one another and can be operated so as to feed from any one and discharge selectively to the other three including a straight-line transfer by-passing any cornering application.

It is, therefore, the principal object of the present invention to provide a novel and improved corner transfer unit for use in combination with conveyor systems.

A second object is the provision of a cornering device of the type aforementioned that is fully automatic and operable at high speeds.

Another object of the invention is to provide a corner transfer unit that is ideally suited to handle bundles and stacked paper articles without spillage, tearing or soiling.

Still another objective is the provision of a cornering unit that will feed from and discharge to any one of the four sides.

An additional object of the invention herein described is to provide a device for transferring articles around right angle corners that utilizes a novel assembly of parallel rollers and interspersed belts, one assembly of which is vertically moveable relative to the other.

Further objects are the provision of a corner transfer assembly that is powerful yet gentle, versatile, rugged, maintenance-free, compact, easy to operate, decorative, and adaptable for use in combination with a wide variety of types and styles of conveyor systems.

Other objects will be in part apparent and in part pointed out specifically hereinafter in connection with the description of the drawings that follows, and in which:

FIGURE 5 is a top plan view of the roller frame, portions of the rollers having been broken away to conserve space and better reveal the construction while other portions have been shown in section;

FIGURE 6 is a side elevation of the roller frame;

FIGURE 7 is a fragmentary end elevation showing the drive mechanism of the unit, portions thereof having been broken away to conserve space and expose the interior construction;

FIGURE 8 is a simplified schematic showing the chain and sprocket drive for turning the belts in one direction;

FIGURE 9 is a simplified schematic similar to FIGURE 8 showing the chain and sprocket drive that turns the belts in the opposite direction;

Figure 1:
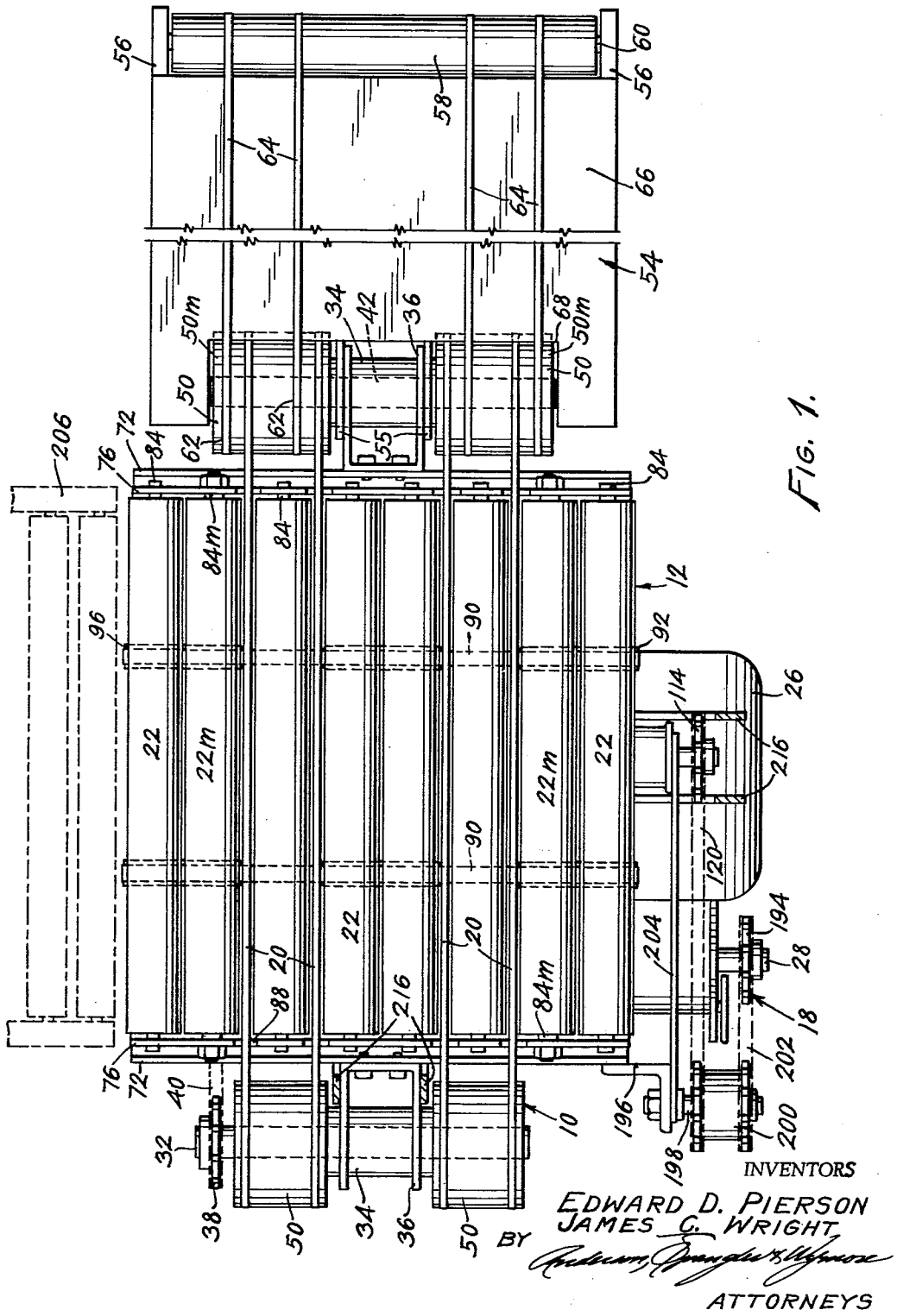
FIGURE 1 is a top plan view of the corner transfer device of the present invention, portions having been broken away to conserve space.

Before proceeding with a detailed description of the apparatus it should be mentioned that the term "belt" will be used frequently throughout both the specification and claims and, while belts are in fact used and have even been shown in the drawings, this term is intended to be generic to any endless flexible element including chains which will obviously function in the same manner and, at most, require only minor changes in the apparatus that are well within the skill of an ordinary mechanic.

Figure 2:
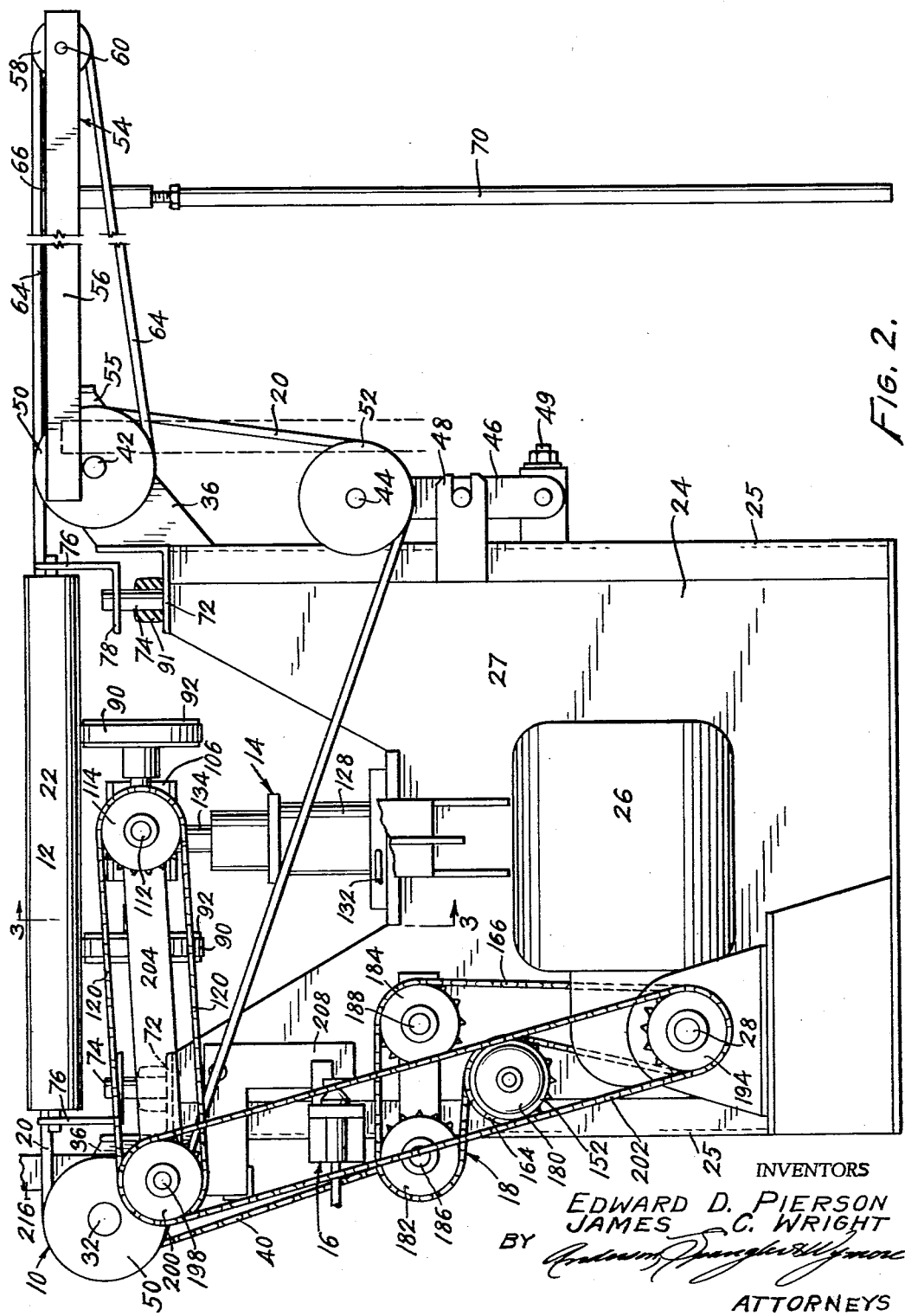
FIGURE 2 is a side elevation in which portions have been broken away to conserve space.

Referring now to the drawings for a detailed description of the corner transfer unit of the present invention and particularly to FIGURES 1 and 2 for this purpose, it will be seen to include a fixed belt conveyor assembly, a moveable roller assembly, a pneumatic assembly for raising and lowering the roller assembly, an actuator assembly for controlling the movements of the pneumatic assembly and a reversible drive mechanism operative to run both the roller and belt assemblies, the aforesaid components having been broadly designated by reference numerals 10, 12, 14, 16 and 18, respectively. The elementary function of the unit is to effect 90° changes in direction in articles conveyed thereon and this is accomplished by means of a belt conveyor assembly 10 that includes a plurality of spaced parallel driven belts 20 between which are journalled a plurality of spaced parallel driven rollers 22 that form a part of roller assembly 12. The belts 20 move intermittently in the same direction although provision is made for reversing the belt conveyor assembly to change the mode of operation of the unit. The roller assembly 12 is elevatable into an overriding relation to the belt conveyor assembly where it functions to lift the article being conveyed above the belts thereby conveying it away in a direction disposed at right angles to the direction in which said belts had been transporting same. Conversely, with the roller assembly in activated position supporting the load, it can be lowered into deactivated position thus dropping said load onto the belts which carry it away in a direction normal to that in which it was originally travelling. The roller assembly 12 is, likewise reversible adding considerably to the versatility of the unit.

Shifting of the roller assembly 12 between deactivated and activated positions with respect to the belt conveyor assembly 10 is accomplished automatically by means of an actuator assembly 16 responsive to movement of the load thereagainst and a pneumatic assembly 14 controlled by said actuator and which is coupled to the roller assembly. A number of refinements are also incorporated into the unit such as, for example, means for stopping the belts of the belt conveyor assembly while the roller assembly is in operative position and means to release the load from contact with the actuator assembly, all of which will be described in detail shortly.

Having set forth quite generally the function of the unit and its major components along with the way in which they correlate, it will be well to examine each of these assemblies in detail and, perhaps, the best place to begin is with belt conveyor assembly 10 for which purpose reference will be made to FIGURES 1, 2, 3, and perhaps, 7. The components of the unit are mounted on a base 24 which is floor-supported and, in the particular form shown, comprises a generally H-shaped structure having end walls 25 and an interconnecting central wall 27. A reversible electric gear motor 26 having a double-ended shaft 28 is mounted on one of the end walls 25 of the base and carries a double sprocket 30. A second shaft 32 is located above motor shaft 28 and is mounted for rotation at a point intermediate its ends within shaft journal 34 that is attached to the end wall 25 of the base by bracket 36. Shaft 32 carries a second sprocket 38 operatively connected to double sprocket 30 by chain 40 and other elements of the drive mechanism 18 that will be described in considerable detail later on.

A third shaft 42 is journalled for rotation on the opposite end of the base in spaced parallel relation to shaft 32. A similar bracket 36 and shaft journal 34 are mounted on the opposite endwall 25 to carry shaft 42; however, the latter shaft has no sprocket. Still another shaft 44 is carried by the endwall underneath shaft 42 in spaced parallel relation to the latter but so mounted that the spacing therebetween can be varied for purposes of installing and removing belts 20 as well as varying the tension therein. Shaft 44 and its associated journal (not shown) are carried on the upper end of a rocker arm subassembly 46 that is pivotally attached at a point intermediate its ends to notched supports 48 that depend from the endwall. An adjustable stop 49 carried by the endwall engages the lower extremity of the rocker arm subassembly tilting the latter about its centrally-located pivot axis thus effecting a shift of shaft 44 relative to shafts 42 and 32.

Shafts 32 and 42 have affixed to opposite ends thereof a pair of grooved rollers 50 while shaft 44, as shown, carries two pairs of V-belt pulleys 52 that correspond to the two grooves in each of the rollers 50. The V-belts 20 are reeved across the tops of the rollers 50 to provide a substantially horizontal load-supporting surface and underneath the V-belt pulleys 52 to complete the belt conveyor assembly 10 that can be operated in either direction in a manner that will be explained presently in connection with the detailed description of drive mechanism 18. It is, of course, necessary to have the grooves in the rollers and the V-belt pulleys properly aligned to maintain the V-belts in spaced parallel relation to one another as the rollers 22 of the roller assembly 12 must operate therebetween. Thus far, the unit is capable of carrying a load along a straight line but in either direction.

Before proceeding with a description of the roller assembly 12, it will be wise to refer briefly to FIGURES 1 and 2 and describe the foldable extension tray that has been designated in a general way by numeral 54 and which is a most useful addition to the unit although it is not a necessary component thereof insofar as carrying out the desired right angle transfer of the load is concerned. The underside of the tray carries a pivot bracket 55 that is slotted to pivotally receive the journal 34 surrounding shaft 42. Side frame elements 56 of the tray have journalled for rotation therebetween another grooved roller 58 mounted on shaft 60. This shaft and associated roller are in spaced parallel relation to shaft 42.

When the extension tray 54 is used, rollers 50m carried by shaft 42 are modified slightly to include an extra pair of V-belt grooves 62. Two more pairs of V-belts 64 are reeved around rollers 50m and roller 58 forming a continuation of the belt conveyor assembly 10. The frame elements 56 are over-layed with a plate 66 that provides a support for the V-belts running across its upper surface. This plate is notched at 68 to receive rollers 50m and the bracket 36 which carries the journal 34 for shaft 42.

An adjustable leg 70 depends from the underside of the tray and, when resting on the floor, braces the latter. This leg is hinged to permit the tray to be raised up leaving a passageway when not in use. Another advantage of this tray is that it stops and holds the load until the corner transfer unit clears whenever the roller frame assembly is elevated and the unit is fed by the belt conveyor assembly.

Reference will now be made to FIGURES 1 through 6, inclusive, for a detailed description of the roller assembly 12. Extending along the top of the base 24 in spaced parallel relation are a pair of horizontal end frame elements 72 supported by the endwalls 25 and central wall 27. In the particular construction illustrated, these frame elements 72 comprise angle irons having vertical pins 74 projecting upwardly from the horizontally-disposed flanges thereof. Four pins in all are used, two on each frame element located adjacent its opposite ends.

Mounted on pins 74 for vertical movement relative to the base is a roller-carrying subframe 76. This subframe comprises a pair of angle irons 78 arranged in spaced parallel relation with one flange vertical and the other horizontal. The horizontal flange of angle irons 78 is apertured as at 80 to receive the pins 74 and so is the vertical flange at 82 to receive the ends of the roller shaft 84 that carry rollers 22 for rotation relative thereto. As shown, one roller 22m near each end has its shaft 34m bolted or otherwise attached to the subframe within circular apertures 86 for rotation about a fixed axis; whereas, the remaining rollers 22 float within apertures 84 that are elongated vertically to allow for some movement of their axes of rotation within a vertical plane. The upper margin of the vertically disposed flange of angle iron subframe elements 78 is notched as shown at 88 to pass the V-belts 20 of the conveyor belt assembly.

The roller-carrying subframe 76 is supported in operative position above end frame elements 72 of the base by V-belts 90 that run along the bottom thereof; whereas, in inoperative position it is supported by resilient stops 91 mounted in pins 74 which deactivate the rollers. Thus, while the belt drive for the roller assembly operates continuously, the rollers themselves operate on an intermittent basis due to the fact that the belts drop out of contact with the rollers when the latter are shifted into inoperative position. These belts, of which there are two, are each reeved in parallel relation over three horizontally aligned pulleys 92, 94 and 96 that are carried on opposite ends of pulley shafts 98, 100 and 102, respectively. Shaft 100 is non-rotatably mounted within vertically-adjustable subframe 106 and the pulleys 94 are journalled on the shaft for relative rotation. Pulleys 92 are fixed to opposite ends of shaft 98 for rotation therewith and the shaft is journalled within bearings 107 carried by subframe 106. Shaft 98 also carries a bevel gear 108 that meshes with a second bevel gear 110 mounted on the end of stub shaft 112 journalled for rotation within the end of subframe 106. Shaft 112 carries a sprocket 114 which, when connected to the drive mechanism 18 by means of chain 120, runs the belts 90 around the three parts of pulleys and these belts, in turn, rotate the rollers 22 in the roller frame.

Shaft 102 is non-rotatably mounted on subframe 106 for longitudinal adjustment providing means for tensioning the belts 90. The ends of the shaft extend through elongate openings 122 in the sides of the subframe 106 and threaded studs 124 extend through the shaft at transversely spaced points. These studs are rotatable within apertures provided in ears 126 of subframe 106 thus providing adjustment means capable of moving shaft 102 toward and away from the fixed shafts 98 and 100. Pulleys 96 are journalled on shaft 102 for relative rotation.

The roller frame is, in fact, supported on the belts 90 by means of fixed rollers 22m adjacent opposite ends thereof and the remaining floating rollers 22 are free to fall down onto the belts which undoubtedly will curve downward slightly under the weight of the roller frame. Otherwise, if rollers 22 were mounted for rotation about a fixed axis as are rollers 22m, it is doubtful that they would contact the belts 90 and be driven thereby.

Figure 3:
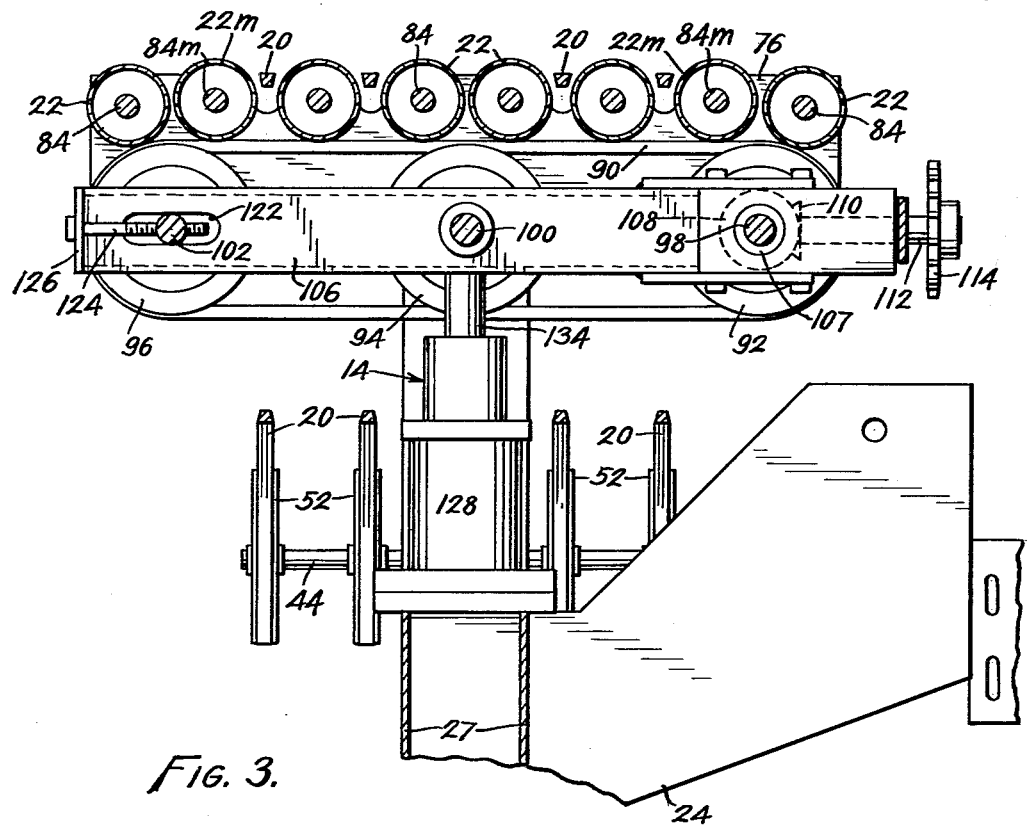
FIGURE 3 is a fragmentary section taken along line 3—3 of FIGURE 2 showing the pneumatic means by which the roller assembly is raised and lowered relative to the belt assembly.
Figure 4:
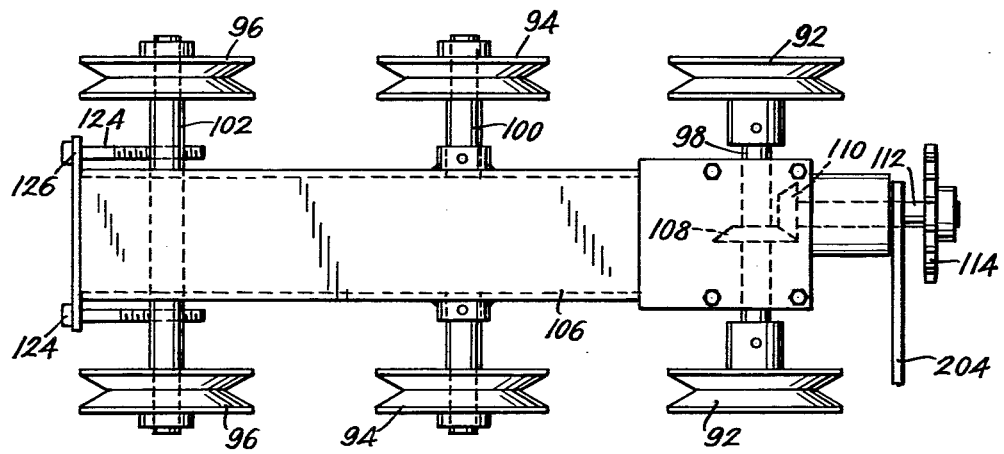
FIGURE 4 is a top plan view of the belt drive for the roller assembly.

Pneumatic assembly 14, as shown most clearly in FIGURES 2 and 3, comprises merely an air cylinder 128 supported on central wall 27 of the base 24 having air lines 130 and 132 (FIGURES 14, 15 and 16) connected to deliver air into opposite ends thereof and the piston rod 134 attached to the underside of the vertically-adjustable subframe 106. Air cylinder 128 and the associated piston 136 and piston rod 134 provide the means by which the belt supported roller frame assembly 12 is shifted vertically into the overriding or extended position of FIGURES 2 and 3 wherein it carries the load and the retracted position in which the load is carried on the belt conveyor assembly 10 at right angles to its direction of movement on the rollers.

Next, the drive mechanism 18 will be described with reference to FIGURES 1, 2, 7, 8, 9 and 10 where it is most clearly revealed. The operative connection between the drive mechanism 18 and belt conveyor assembly 10 has not yet been set forth in sufficient detail; therefore, the description that follows will first be directed to the connections between reversible electric gear motor 26 and said conveyor belt assembly.

Figure 10:
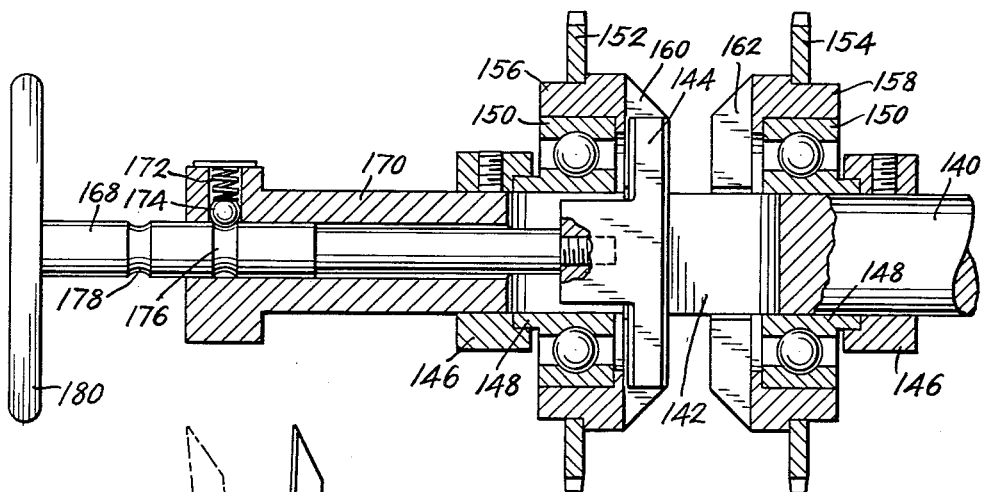
FIGURE 10 is a fragmentary diametrical section to an enlarged scale showing the details of the jaw clutch operatively interconnecting the chain and sprocket drive mechanism of FIGURES 8 and 9 with the belt conveyor assembly.

The central wall 27 of the base 24 carries bearings 138 within which shaft 140 is journalled in spaced parallel relation to shaft 28. As seen in FIGURE 10, one end of shaft 140 is slotted axially as indicated at 142 providing a track for movement of a generally T-shaped key 144. A pair of collars 146 attach inner ball bearing races 148 to the slotted end of the shaft 140 for rotation therewith in axially spaced but coaxial relation to one another. The outer ball races 150 are, of course, free to rotate independent of their inner races 148, shaft 140 and one another. Sprocket 152 is mounted on one of the outer races 150 for rotation therewith independent of sprocket 154 which is similarly mounted on the other outer race. The hubs 156 and 158 of sprockets 152 and 154 each contain diametrical slots 160 and 162, respectively, which open toward one another and are alignable with the slot 142 in the shaft in certain rotational positions. Each of these last-mentioned slots will, when aligned with the slot in the shaft, receive the T-shaped key 144 that is mounted for axial movement therein thus selectively locking one or the other of the sprockets 152 and 154 to shaft 140 for joint rotation while the remaining sprocket turns free of said shaft. Sprockets 152 and 154 are aligned with the toothed portions of double sprocket 30 carried by the motor shaft 28 and are connected thereto by chains 164 and 166 for rotation in opposite directions as will be explained presently.

Key 144 is shifted manually between sprockets 152 and 154 by means of axially-moveable rod 168 that is seen most clearly in FIGURE 10. The rod 168 is carried for axial movement within the tubular end 170 of shaft 140. The casing includes a radial socket 172 into which is placed a spring-biased ball detent 174 that releasably engages within one of two annular grooves 176 and 178 in the rod that correspond to the positions of the key within the diametrical slots 160 or 162. A handle 180 is shown on the free end of rod 168 for use in shifting the latter and key between their two operative positions.

Now, with particular reference to FIGURES 2, 7, 8 and 9, it will be seen that with key 144 in position to lock sprocket 152 to shaft 140, the latter shaft will turn the same direction as the motor shaft 28. On the other hand, when key 144 is shifted from slot 160 in sprocket 152 into slot 162 in sprocket 154, shaft 140 will rotate in the opposite direction to that in which shaft 28 is turning. This is accomplished by reeving sprocket chain 166 around the opposite side of sprocket 154 and then around idler sprockets 182 and 184 before returning to double sprockets 30. An examination of FIGURES 2 and 9, in particular, will reveal that shaft 140 will always turn the opposite direction of shaft 28 when sprocket 154 and idler sprockets 182 and 184 are operatively connnected into the system. Of course, the sprocket (152 or 154) that is disengaged from shaft 140 will continue to turn by virtue of its connection to drive shaft 28; however, it will be free to turn in the opposite direction in which shaft 140 is being turned due to the roller bearing assembly 148, 150 that supports same on said shaft. Idler sprockets 182 and 184 are journalled for rotation on stub shaft 186 and 188 respectively, depending from central wall 27 of the base 24.

Specifically with reference to FIGURE 7, it can be seen that shaft 140 carries a sprocket 190 that is clutch-controlled by pneumatic clutch 192 for intermittent operation. Shaft 140 is, of course, rotating continuously as long as the motor 26 is energized; however, it was found that certain types of loads such as, for example, stacked newspapers were easily torn and soiled by the V-belts of the conveyor assembly 10 if the latter kept running while the switch was made to the roller assembly 12 as the conveying medium. Accordingly, when the unit was to be used in transporting easily damaged loads, it was considered desirable to run the belts of the conveyor assembly on an intermittent rather than a continuous basis. This was accomplished quite simply by mounting sprocket 190 on shaft 140 for independent relative rotational movement and then interconnecting said sprocket and shaft by means of a conventional pneumatic clutch 192 which upon actuation, interlocked the sprocket and shaft for conjoint rotation. The description of the means for actuating clutch 192 and the intervals during which it becomes operative will be defererd for the present and taken up in detail along with the explanation of actuating assembly 16 which controls same. For the time being, it will suffice to point out that sprocket 190 is operatively connected to sprocket 38 of the conveyor belt assembly 10 by chain 40.

The roller assembly 12 is, likewise, driven from reversible gear motor 26 as its output shaft 28 has a single sprocket 194 on the opposite end thereof from double sprocket 30 that is operatively connected to sprocket 114 in a manner that will now be described with particular reference to FIGURES 1 and 2. An L-shaped bracket is attached to the end of angle iron frame element 72 on top of endwall 25 of the base that is nearest the gear motor 26 as shown. A stub shaft 198 projects from this bracket and a double sprocket 200 is journalled thereon in position such that one set of teeth are aligned with sprocket 194 to which they are connected by chain 202 while the remaining set of teeth are connected to sprocket 114 by chain 120. The belt carrying subframe 106 mounted on the upper extremity of piston rod 134 is free to turn in a horizontal plane due to the fact that the piston is rotatable within the cylinder; therefore, to maintain the proper right angle relationship between belts 90 and rollers 22 with chain 120 pulling on one end of frame 106, a rigid spacer 204 interconnects shaft 198 and 112 to which it is pivotally connected in order to permit vertical movement of the roller assembly 12.

Thus, the roller assembly 12 can be run in either direction depending upon which direction the reversible gear motor 26 is operated. Likewise, the conveyor belt assembly 10 can be operated in either direction regardless of the direction the motor is turning by merely shifting T-shaped key between the slotted hubs of sprockets 152 and 154. The corner transfer unit as illustrated, therefore, is capable of receiving a load from any one of four different directions carried thereto by a suitable standard straight line conveyor unit such as that indicated in dotted lines in FIGURE 1 and identified by numeral 206. Conversely, it can discharge the load in any of the four directions. The obvious versatility of the unit is such that little imagination is required to visualize a great number of different applications to which it is ideally suited. It is the particular function or functions to be performed by the unit, however, that determine in large measure the means selected to shift the roller frame assembly 12 between its operative and inoperative positions. In other words, it is quite apparent that many different mechanisms would readily occur to one skilled in the art for raising and lowering the roller frame assembly ranging all the way from a simple manually-operated foot pedal arrangement or the like to a completely automatic system that included a mechanical, electronic or optical sensing device coupled with some mechanical arrangement adapted to accomplish the actual shift. The end use for the unit is, therefore, oftentimes the determining factor in deciding whether to equip the unit with an automatic, semi-automatic or manual roller frame assembly shift mechanism.

For example, consider the use of the corner transfer unit at the intersection of four power-driven conveyor flights, any one of which can be operated in either direction with the entire system being used to load and unload items from several loading and unloading stations on an intermittent and unpredictable basis. In such an instance, an operator would almost always be required who would determine visually the path through the system to be followed by the load. If infrequent changes in the mode of operation were all that were required, a manual shift would be entirely adequate; otherwise, a semi-automatic system programmed by the operator would appear to be best.

Next, consider a system which is essentially static insofar as its modes of operation are concerned. Here a fully automatic system would obviously be desirable to eliminate the need for an operator.

Finally, there is the system wherein a certain amount of pre-programming is possible, at least to the extent that the services of an operator could be dispensed with; yet, more than one mode of operation is needed. Such a system might involve, for example, feeding finished articles from three different assembly points to a common packaging line. To accomplish this, sensing elements could be provided at each of the three entry points of the corner transfer unit which, upon actuation by a load moving thereagainst, would set the corner unit to receive the load from that particular feeder line and send it onto the packaging line before accepting a load from another feeder line. Conversely, a common component line could be set up so as to automatically feed on an alternating basis to two or three assembly points in succession.

Accordingly, the means which will now be described for automatically shifting the roller frame assembly between its inoperative and operative positions in response to actuation of a sensing device by the load is intended as being illustrative of one of the many such systems that could be designed to accomplish the same or similar functions. This is not to say, however, that the unit herein disclosed is devoid of patentable novelty but only that it is not the only system that could be used to carry out the desired function. Reference will, therefore, be made to FIGURES 1, 2 and 11 through 17, inclusive, for a detailed description of the pneumatic system 14 for operating the piston 136 upon which the roller frame assembly is carried and the actuating system 16 for controlling the latter.

Pivotally mounted on opposite sides the central wall 27 of the base are a pair of L-shaped rocker arms 208 in position such that the horizontal legs 210 thereof extend beyond the edge of angle iron frame element 72 toward which they are biased by tension springs 212. These L-shaped rocker arms are interconnected at their free ends by a bracket 214 adapted to removably receive an upright pair of spaced parallel lever arms 216 that extend above the horizontal conveying surface of the roller and conveyor belt frame assemblies. These lever arms are interconnected at their upper extremities by a plate 218 projecting out over the conveying surface in the path of the loads conveyed thereon.

The preferred mode of operation of the unit is to deliver the load onto the extension unit 54 and take it off on the roller assembly. The reason this is preferred is because pneumatic clutch 192 automatically stops the belt conveyor assembly 10 including the extension unit 54 whenever the roller assembly 12 is elevated into operative position. Thus, the extension unit automatically stops and holds any article being conveyed onto the corner unit until the article immediately ahead thereof has cleared the corner and the roller assembly has again retracted. This feature can be quite significant where the conveyed articles run close together in a more or less random fashion where they are likely to run into one another on the corner. Of course, where the conveyed articles are uniformly spaced and timed to permit each article to clear thte corner before another one enters, the corner unit can feed in either direction with equally good results.

Figure 14:
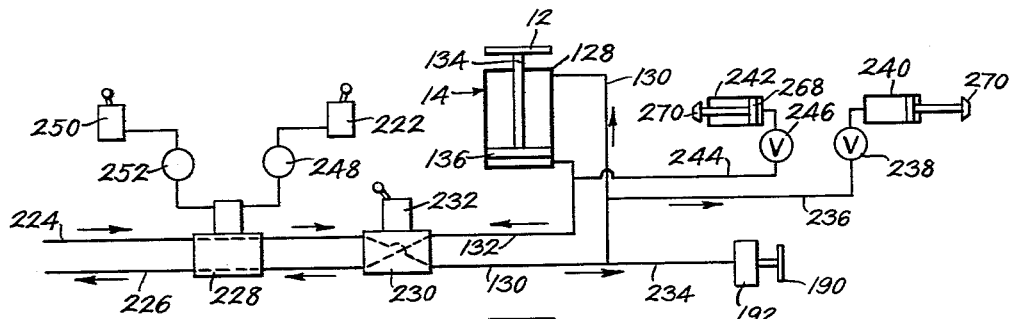
FIGURE 14 is a schematic showing the position of the control valve and mode selection valve when the feed onto the corner transfer unit is by means of the belt conveyor assembly preparatory to the introduction of a conveyed article.

In that in some instances the introduction of the conveyed articles by means of the extension tray is preferred, reference will initially be made to FIGURES 14 and 15 wherein the bangboard assembly is located to receive the conveyed articles from the belt conveyor assembly and actuate microswitch 222. High pressure line 224 is connected to a source of fluid, preferably air, at an elevated pressure while exhaust line 226 exhausts the fluid to the atmosphere. Both of the aforementioned lines are connected into a solenoid-operated two-way control valve 228 that functions to raise and lower the piston 136 and associated roller frame assembly 12.

Figure 15:
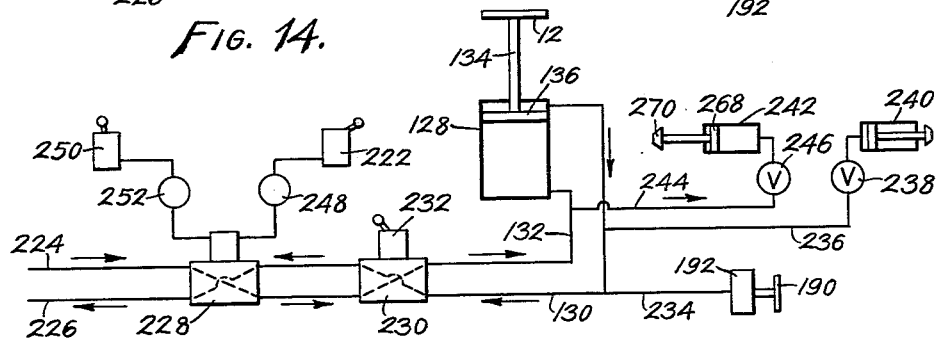
FIGURE 15 is a schematic similar to FIGURE 14 showing the control valve in actuated position in response to movement of a load onto the unit.
Figure 16:
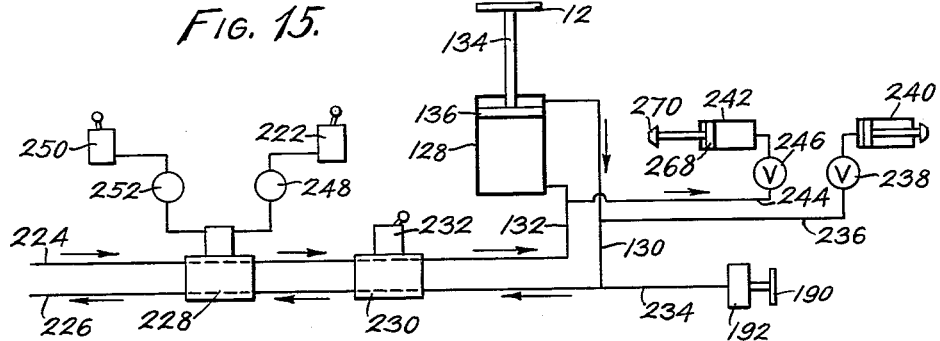
FIGURE 16 is a schematic similar to FIGURE 14 except that the mode selection valve has been shifted into position to receive conveyed articles on the roller assembly; and, FIGURE 17 is a schematic similar to FIGURE 15 showing the control valve in actuated position when the mode selection valve is changed into the mode of FIGURE 16.

With the conveyed articles entering on the belt conveyor assembly 10, the normal or unactuated position of the unit is that represented in FIGURE 14 wherein the piston and associated roller frame assembly are retracted; however, when the conveyed articles enter on the roller assembly instead of the belt assembly there is a second normal or unactuated position in which the piston is raised as shown in FIGURE 16. If, as illustrated, a single two-way control valve is used in one instance (FIGURES 14 and 15) to raise the roller frame assembly upon actuation and, in a second instance (FIGURES 16 and 17) to lower same, means are necessary for reversing the function of the control valve 228 depending upon which of the two modes of operation is being used. Such means has been represented in FIGURES 14–17, inclusive, by a second solenoid-operated two-way valve 230 which functions solely as a mode-selection valve operative to reverse the ends of the cylinder 128 into which the high pressure fluid is fed and from which the exhausted fluid is taken. This mode selection valve is manually-controlled by a mode-selector switch 232.

When the mode selector switch is thrown to the left as shown in FIGURES 14 and 15, valve 230 is set to receive conveyed articles on the belt conveyor assembly 10. Now, with control valve 228 unactuated and valve 230 set as above, the high pressure outlet of valve 228 is connected by valve 230 into line 130 leading into the top of the cylinder thus maintaining the roller frame assembly 12 in retracted position while exhausting fluid from the bottom of the cylinder through line 132 as shown in FIGURE 14. This is the normal or pre-actuated condition that exists when loads are introduced onto the corner transfer unit by means of the belt conveyor assembly 10 but before such loads are actually received. A branch line 234 carries high pressure fluid from line 130 to pneumatic clutch 192 thus actuating same to operate the belt conveyor assembly which is in the operative position. Another branch line 236 is connected into line 130 and delivers fluid under pressure through flow control valve 238 to push-rod assembly 240 thus actuating the latter into extended position as shown; however, this push-rod assembly is functionally inoperative when the conveyed material is entering on the belt conveyor assembly 10 as the bangboard unit 216, 218 is positioned so as to be operated by the other push-rod assembly 242. The latter push-rod assembly is connected into line 132 by means of branch line 244 that carries flow control valve 246 and which is likewise inoperative with the control valve 228 unactuated as line 132 is only carrying the exhaust fluid at substantially atmospheric pressure.

Figure 11:
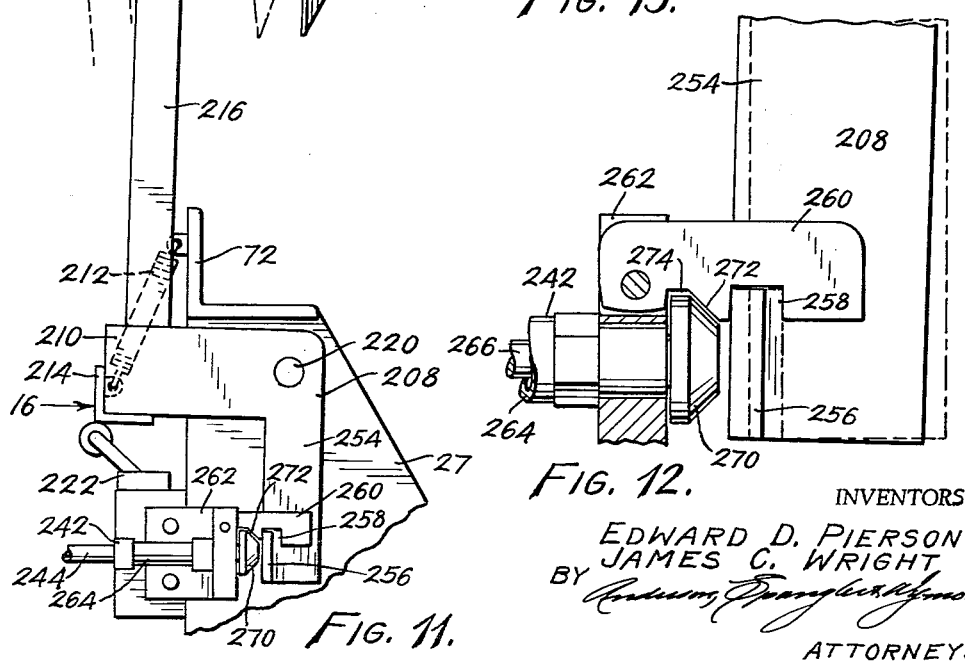
FIGURE 11 is a fragmentary detail illustrating the actuating mechanism of the pneumatic assembly.

Next, with reference to FIGURES 11 and 15, when the conveyed article enters the corner transfer unit on the belt conveyor assembly and strikes the bangboard unit 218 positioned in its path, L-shaped rocker arm 208 will rock about its pivot 220 and actuate microswitch 222 into actuated position, in turn, actuates timer mechanism 248 which shifts control valve 228 into its actuated position for a pre-set time interval that will permit the load to clear the corner transfer unit. Shifting control valve 228 into actuated position causes the high pressure fluid to enter the bottom of cylinder 128 thus raising the piston 136 and associated roller frame assembly 12 into overriding operative position which, at the same time exhausts fluid from above the cylinder at substantially atmospheric pressure through line 130. Also, the pneumatic clutch 192 stops and disconnects the belt conveyor assembly 10 from the drive mechanism due to the low pressure of the exhaust fluid now passing through line 130. With the belts thus stopped, a second conveyed article moving onto the corner transfer unit will be held at the extension tray until the belt conveyor assembly is again actuated following movement of the first article off the roller assembly. Simultaneously, push-rod assembly 242 is actuated by the high pressure in line 132 to further retract the bangboard assembly out of the way of the conveyed article on the roller assembly as will be described in detail presently in connection with FIGURES 11, 12 and 13. Finally, as the timer mechanism 248 reaches the end of its cycle, it resets valve 228 to its original unactuated position of FIGURE 14 and spring 212 pulls the bangboard assembly back into the full line position of FIGURE 11 allowing microswitch 222 to open preparatory to initiating the next cycle.

Figure 17:
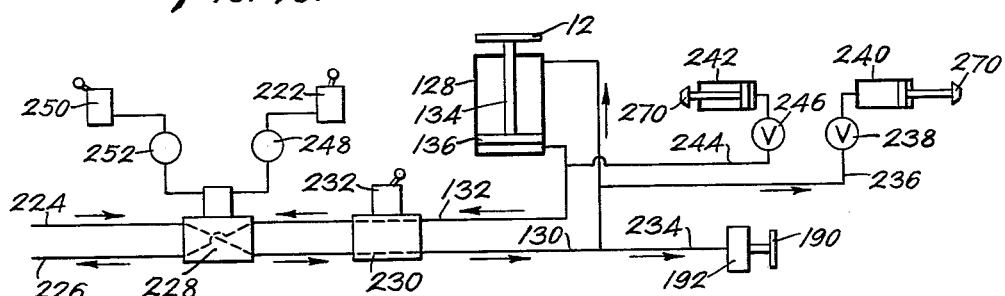

Now, assume the conveyed articles are to be received on the roller frame assembly and discharged onto the conveyor belt assembly. If so, the normal position of the unit preparatory to receiving the first article is such that the piston 136 and associated roller frame structure must be elevated into operative position. This is accomplished by moving the mode-selection switch 232 to the right as shown in FIGURES 16 and 17 thus shifting valve 230 so that the fluid paths therethrough are parallel to one another rather than intersecting as was the case in FIGURES 14 and 15. It is also necessary to move the bangboard assembly 216, 218 from the left side of the unit where it actuates microswitch 222 as viewed in FIGURE 1 to the bottom of the unit as seen in the same figure in position to actuate microswitch 250 when the conveyed articles move across the roller frame assembly. The normal or unactuated position of control valve 228 is unchanged although the direction of fluid flow through lines 130 and 132 is reversed due to the position of valve 230. Thus, as seen in FIGURE 16, when microswitch 250 is unactuated, the high pressure fluid is connected into the bottom of cylinder 128 raising piston 136 while fluid is exhausted from the top thereof through line 130. Clutch 192 is deenergized as line 234 is connected into line 130 carrying only exhaust fluid at atmospheric pressure; therefore, the belt conveyor assembly 10 is disconnected from the drive mechanism. Push-rod assembly 242 is extended by virtue of its connection into high pressure line 132 through line 244; however, it is functionally inoperative as the bangboard unit has been removed and replaced in position to be actuated by push-rod unit 240.

Next, with reference to FIGURE 17, when an article transported on the roller assembly strikes the bangboard, the latter functions in the same manner already described to actuate microswitch 250. This switch, in turn, actuates timer 252 which shifts control valve 228 into its operative position for the preset time interval for which the timer is programmed. Of course, when valve 228 shifts, the high pressure fluid is directed through line 130 into the top of the cylinder thus lowering the piston and roller frame assembly while, at the same time, actuating clutch 192 to operatively connect the belt conveyor assembly to the drive mechanism. Simultaneously, high pressure fluid is bled off line 130 into line 236 and through flow control valve 238 to push-rod 240 extending the latter so as to rock the bangboard until out of the way of the passing bundle or other article moving around the corner. Push-rod unit 242, on the other hand, is now connected into the exhaust side of the system and the fluid therein bleeds back out readily.

Figure 13:
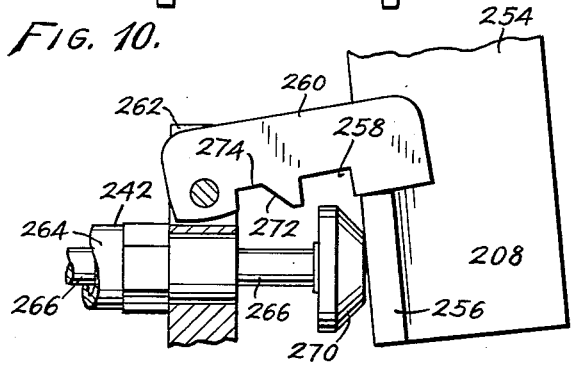
FIGURE 13 is a fragmentary detail similar to FIGURE 12 except that the push-rod is shown in extended position.

Finally, with reference to FIGURES 11, 12 and 13, the construction and operation of the push-rod units will now be described. Both push-rod units 240 and 242 are identical although only one is functionally operative at a time depending upon the location of the bangboard assembly. The vertical leg 254 of the L-shaped rocker arms has an ear 256 projecting laterally therefrom which is received in notch 258 in the underside of latch element 260. This latch is pivotally attached at one end thereof to push-rod bracket 262 that is fastened to central wall 27 of the frame. The latch is free to raise up vertically from the latched position shown in FIGURES 11 and 12 into the unlatched position of FIGURE 13 wherein the ear 256 is released from the notch 258.

Figure 12:
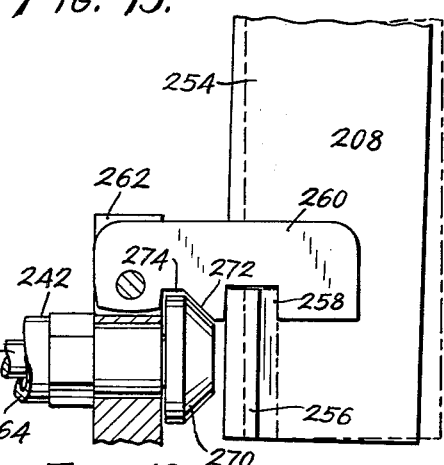
FIGURE 12 is a fragmentary detail partly in section and to an enlarged scale showing the push-rod of the actuating mechanism in retracted position.

The width of notch 258 is greater than the thickness of ear 256 thus enabling the L-shaped rocker arm 208 and associated bangboard unit to move from the full line position of FIGURE 12 into the dotted line position thereof before engaging the forward edge of the notch in the latch. This degree of free movement of the bangboard unit is sufficient to actuate microswitch 222 and is caused as has already been described by a bundle or other conveyed article striking the bangboard.

At this point, however, the plate of the bangboard remains in position to rub against the side of the conveyed article as it moves past which is likely to turn the article and leave it in a skewed position. It is desirable, therefore, to move the bangboard further out of the way, i.e. the dotted line position of FIGURE 11, once the microswitch has been actuated. This is accomplished quite simply and effectively by means of the fluid-pressure-actuated push rods.

Bracket 262 also carries the cylinder 264 of the push-rod unit which is connected to receive fluid from and exhaust fluid into line 244. Within this cylinder is mounted for reciprocal movement a push rod 266 that carries a piston 268 (FIGURES 15–17) on one end thereof and a frusto-conical head 270 functions as a cam which moves against the inclined edge 272 of a second notch 274 in the underside of latch element 260 thus raising the latter from the latched position of FIGURES 11 and 12 into the unlatched position of FIGURE 13 as it becomes extended under the influence of fluid pressure exerted on the other end of the push rod from line 244. As soon as the head of the push rod begins to raise the latch it also engages the ear 256 of the L-shaped rocker arm and pushes the latter along with the remainder of the bangboard assembly into the dotted line fully retracted position of FIGURE 11 in opposition to the bias of tension spring 212. The latch remains raised into unlatched position and the bangboard assembly fully retracted until the pressure on cylinder 264 is released whereupon these elements return to their original positions preparatory to initiation of another operating cycle.

Having thus described the several useful and novel features of the corner transfer unit of the present invention, it will be seen that the several worthwhile objectives for which it was designed have been achieved. Although but a single specific embodiment of the invention has been illustrated and described in connection with the accompanying drawings, we realize that certain changes and modifications therein may well occur to those skilled in the art within the broad teaching hereof; hence, it is our intention that the scope of protection afforded hereby shall be limited only insofar as said limitations are expressly set forth in the appended claims.

What is claimed is:

1. A corner transfer unit adapted to receive conveyed articles from one conveyor and deliver same to a second conveyor disposed at right angles to the first which comprises, a belt conveyor assembly including a plurality of belts arranged in spaced parallel relation to one another defining a first substantially horizontal and planar conveying surface, a roller assembly having a plurality of elongate rollers journalled for rotation in the spaces between the belts in spaced parallel relation to one another defining a second substantially horizontal and planar conveying surface, elevating means connected to one of said belt and roller assemblies operative upon actuation to interchange the first and second conveying surfaces by lifting one into a raised operative position overriding the other from an inoperative position therebeneath, instantly reversible drive means operatively connected to both the roller and belt conveyor assemblies, said drive means turning all the rollers in the same direction so as to transfer articles supported thereon transversely across the belts, and said drive means turning all of the belts in the same direction so as to convey an article supported thereby in a direction normal to the direction such article is conveyed when supported on the rollers, and control means responsive to the movement of a conveyed article onto one of the first and second conveying surfaces operative to actuate the elevating means.

2. The corner transfer unit as set forth in claim 1 in which the drive means includes a reversing mechanism selectively connected to one of the roller and belt assemblies, said reversing mechanism being adapted upon actuation to reverse the direction of movement of the assembly to which it is operatively connected without effecting the other of said assemblies.

3. The corner transfer unit as set forth in claim 2 in which the reversing mechanism operatively interconnects the motor and the belt conveyor assembly.

4. The corner transfer unit as set forth in claim 1 in which the drive means includes clutch means responsive to actuation of the elevating means, said clutch means being connected to the belt conveyor assembly and operative to disconnect the drive thereto whenever the elevating means is actuated to place the roller assembly into the overriding operative position.

5. The corner transfer unit as set forth in claim 4 in which the belt conveyor assembly includes a second set of spaced substantially parallel belts having one end thereof interspersed between the opposite ends of the first set thereof and extending laterally beyond the latter and the end of the roller assembly to define an extension of the first conveying surface and common roller means operatively interconnecting the adjacent interspersed ends of the first and second sets of belts to form a driving connection therebetween, said second set of driven belts forming means adapted to stop and hold an incoming load before it reaches the first set of belts while a preceding load clears the roller assembly upon being disconnected from the drive means in response to actuation of the elevating means so as to de-energize the clutch means.

6. The corner transfer unit as set forth in claim 4 in which the clutch means is of the fluid-actuated type, the belt conveyor assembly is fixed, the elevating means is operatively connected to the roller assembly and includes a cylinder, a piston connected to the roller assembly mounted for reciprocating movement in the cylinder and a source of fluid under pressure connected into both the top and bottom of the cylinder and to the clutch means, and in which the control means includes valve means operatively connected to the elevating means adapted in a first position to deliver fluid to the bottom of the cylinder while exhausting same from the top thereof, and said valve means being adapted in a second position to simultaneously deliver fluid to the top of the cylinder and to the clutch means thereby lowering the roller assembly into inoperative position and activating the belt conveyor assembly while exhausting fluid from the bottom of the cylinder.

7. The corner transfer unit as set forth in claim 1 in which the roller assembly includes a roller frame journalling one roller adjacent each end for rotation about fixed axes and the remaining rollers for rotation about axes limitedly moveable in a vertical plane, a subframe immediately underneath the roller frame, a pair of shafts depending from opposite ends of the subframe in spaced parallel relation to one another and to the fixed axes of rotation of the rollers, a pair of pulleys mounted on each shaft underneath opposite end portions of the rollers, one pulley of each pair being aligned with a pulley of the other pair, a belt operatively interconnecting the aligned pulleys of both pairs, and means interconnecting the the subframe and roller frame so as to provide relative vertical movement therebetween whereby said roller frame is floatingly supported by the rollers resting on the belts and said rollers are turned when said belts are driven in the same direction.

8. The corner transfer unit as set forth in claim 1 in which the drive means comprises a motor having a double-ended output shaft, means forming a driving connection between one end of said output shaft and the roller assembly, and reversing means forming a driving connection between the other end of said output shaft and the belt conveyor assembly, said reversing means including a second shaft journalled for rotation in spaced parallel relation to the output shaft, a pair of drive elements mounted on the output shaft in side-by-side relation for rotation therewith in the same direction, a pair of driven elements mounted on the second shaft for rotation relative thereto in aligned relation to the pair of drive elements, means operatively interconnecting one of the drive and driven elements to rotate them in the same direction, means operatively interconnecting the other of the drive elements with the remaining driven element adapted to turn the latter in the opposite direction to that in which said drive elements are turning, and latch-forming means adapted to selectively interconnect either one of the driven elements to the second shaft for conjoint rotation while leaving the other of said driven elements free to rotate relative to said second shaft in the opposite direction.

9. The corner transfer unit as set forth in claim 8 in which the driven elements are journalled for relative rotation on the second shaft in side-by-side spaced relation and each contains a diametrical slot facing the other of said elements, the second shaft is provided with an elongate slot extending between the driven elements and alignable with the diametrical slots therein in selected relative rotarial positions, and in which the latch-forming means comprises a key retained in the slot in the second shaft for slideable movement into locking engagement within the diametrical slot in either of the driven elements.

10. The corner transfer assembly as set forth in claim 1 in which: the elevating means comprises a cylinder fixedly mounted beneath the roller assembly, a piston mounted within the cylinder for reciprocal movement along a substantially vertical axis, said piston being connected to the roller assembly to provide means adapted to raise and lower same relative to the belt conveyor assembly, and a source of fluid under pressure connected into the cylinder both above and below the piston; and in which the control means includes valve means operatively connected to the elevating means and adapted in one position to admit fluid beneath the piston while exhausting same from the top thereof thus elevating the roller assembly, and said valve means being operatively connected in a second position to admit fluid into the top of the piston while exhausting fluid from the underside thereof thereby lowering the roller assembly, timer means operatively connected to the valve means adapted upon actuation to shift said valve means from first to second position during a predetermined interval sufficient to allow a conveyed article to clear the unit, a pair of sensing elements connected to the timer means and independently operative to actuate same, the first of said sensing elements being located and adapted to respond to movement of a conveyed article onto the unit by means of the belt conveyor assembly when the latter is in superimposed position, and the second of said sensing elements being located and adapted to respond to movement of a conveyed article onto the unit by means of the roller assembly when it occupies the more elevated position, and means connected to the cylinder for reversing the directions of fluid flow between said cylinder and valve means without shifting the latter from first to second position, said fluid-flow reversing means being operable to normally maintain the roller assembly in either its elevated operative position or its retracted inoperative position depending upon which of the belt and roller assemblies has been selected to carry an incoming load.

11. The corner transfer unit as set forth in claim 1 in which, the control means includes a sensing element located and adapted to respond to the movement of a conveyed article onto the conveying surface that is in the elevated operative position and actuate the elevating means in a manner to effect an interchange of said conveying surfaces, and said control means also includes timer means responsive to triggering of the sensing element to actuate and subsequently deactuate said elevating means thus returning the conveying surfaces to their original positions following the lapse of a pre-determined time interval sufficient to permit the conveyed article to move off the corner transfer unit preparatory to receiving another initiating impulse.

12. The corner transfer unit as set forth in claim 11 in which the sensing element of the control means comprises an impact-actuated trigger positioned in the path of a conveyed article moving onto the conveying surface that is in elevated operative position, and in which said control means also includes means responsive to actuation thereof operatively connected to the impact-actuated trigger adapted to retract the latter into a position out of contact with the load which initially engaged same.

References Cited in the file of this patent
UNITED STATES PATENTS

| | | |
|---|---|---|
| 1,737,762 | Howe | Dec. 3, 1929 |
| 1,809,456 | Streeter | June 9, 1931 |
| 2,883,033 | Armstrong | Apr. 21, 1959 |